United States Patent
Kirkpatrick

(10) Patent No.: US 10,507,599 B2
(45) Date of Patent: Dec. 17, 2019

(54) MOLDABLE EARPIECE HEATING CASE

(71) Applicant: Decibullz LLC, Fort Collins, CO (US)

(72) Inventor: Kyle J Kirkpatrick, Loveland, CO (US)

(73) Assignee: Decibullz LLC, Fort Collins, CO (US)

( * ) Notice: Subject to any disclaimer, the term of this patent is extended or adjusted under 35 U.S.C. 154(b) by 378 days.

(21) Appl. No.: 15/481,983

(22) Filed: Apr. 7, 2017

(65) Prior Publication Data
US 2018/0290341 A1    Oct. 11, 2018

(51) Int. Cl.
*B29C 33/04*    (2006.01)
*B29C 35/04*    (2006.01)

(52) U.S. Cl.
CPC ............ *B29C 33/04* (2013.01); *B29C 35/041* (2013.01); *B29K 2995/0046* (2013.01)

(58) Field of Classification Search
CPC .... H04R 1/1083; H04R 1/1058; B29C 33/04; B29C 35/041; B29K 2995/0046
See application file for complete search history.

(56) References Cited

U.S. PATENT DOCUMENTS

| | | | |
|---|---|---|---|
| 516,135 A | 3/1894 | Thamm |
| 904,715 A | 11/1908 | McWilliams |
| 1,340,512 A | 5/1920 | Morton |
| 2,377,739 A | 6/1945 | Wyckoff |
| 2,430,229 A | 11/1947 | Kelsey |
| 2,521,414 A | 9/1950 | Schier |
| 2,729,376 A | 1/1956 | Gould et al. |
| 2,881,759 A | 4/1959 | Hocks et al. |
| D185,740 S | 7/1959 | Criswell |
| 3,068,954 A | 12/1962 | Strzalkowski |
| 3,112,668 A | 12/1963 | Moshay |
| D206,665 S | 1/1967 | Sanzone |
| D208,784 S | 10/1967 | Sanzone |
| 3,411,501 A | 11/1968 | Greenberg |
| 3,415,246 A | 12/1968 | Hill |
| 3,440,365 A | 4/1969 | Bryant et al. |
| D215,138 S | 9/1969 | Makey |
| 3,810,812 A | 5/1974 | Koenig |
| 4,063,552 A | 12/1977 | Going et al. |
| D250,033 S | 10/1978 | Stein |
| D266,271 S | 9/1982 | Johanson et al. |
| D266,590 S | 10/1982 | Bennett |

(Continued)

FOREIGN PATENT DOCUMENTS

EP    0895703    2/1999
EP    1032243    8/2000
(Continued)

OTHER PUBLICATIONS

Chinese Patent Application No. 201380013425.X; 2$^{nd}$ Office Action dated Mar. 31, 2017, 8 pages total.

(Continued)

*Primary Examiner* — Joseph S Del Sole
*Assistant Examiner* — Mohamed K Ahmed Ali
(74) *Attorney, Agent, or Firm* — Craig R. Miles; CR Miles P.C.

(57) ABSTRACT

A moldable earpiece heating case for heating a first and second moldable earpiece to achieve a moldable condition which can be configured to fit within the auricle of the ear.

16 Claims, 14 Drawing Sheets

(56) References Cited

U.S. PATENT DOCUMENTS

| | | |
|---|---|---|
| 4,412,096 A | 10/1983 | Edgerton et al. |
| D278,363 S | 4/1985 | Schenkel et al. |
| 4,537,187 A | 8/1985 | Scott |
| 4,579,112 A | 4/1986 | Scott |
| D290,203 S | 6/1987 | Berry, Jr. |
| 4,702,238 A | 10/1987 | Scott |
| 4,880,076 A | 11/1989 | Ahlberg et al. |
| 5,002,151 A | 3/1991 | Oliveira et al. |
| 5,048,092 A | 9/1991 | Yamagishi et al. |
| 5,185,802 A | 2/1993 | Stanton |
| 5,321,757 A | 6/1994 | Woodfill, Jr. |
| 5,470,892 A | 11/1995 | Gupta et al. |
| 5,659,156 A | 8/1997 | Mauney et al. |
| 5,676,068 A | 10/1997 | Kallander |
| 5,711,313 A | 1/1998 | Fleming |
| 5,718,244 A | 2/1998 | Thornton |
| 5,753,781 A | 5/1998 | Oxman et al. |
| 5,881,159 A | 3/1999 | Aceti et al. |
| 5,950,794 A | 9/1999 | Porco et al. |
| 6,082,485 A | 7/2000 | Smith |
| 6,122,388 A | 9/2000 | Feldman |
| 6,301,367 B1 | 10/2001 | Boyden et al. |
| 6,310,961 B1 | 10/2001 | Oliveira et al. |
| 6,354,990 B1 | 3/2002 | Juneau et al. |
| 6,434,248 B1 | 8/2002 | Juneau et al. |
| 6,445,865 B1 | 9/2002 | Janus et al. |
| 6,511,732 B1 | 1/2003 | Chao |
| 6,595,317 B1 | 7/2003 | Widmer et al. |
| 6,688,421 B2 | 2/2004 | Dyer et al. |
| 6,690,807 B1 | 2/2004 | Meyer |
| 6,761,789 B2 | 7/2004 | Juneau et al. |
| D505,132 S | 5/2005 | Linville et al. |
| D527,056 S | 8/2006 | Manville |
| 7,130,437 B2 | 10/2006 | Stonikas et al. |
| D535,642 S | 1/2007 | Garcia et al. |
| 7,217,335 B2 | 5/2007 | Juneau et al. |
| D550,202 S | 9/2007 | Meier et al. |
| 7,403,629 B1 | 7/2008 | Aceti |
| D593,076 S | 5/2009 | Kung et al. |
| 7,627,131 B2 | 12/2009 | Nielsen et al. |
| 7,628,366 B2 | 12/2009 | Scott |
| D622,265 S | 8/2010 | Rye |
| 7,778,434 B2 | 8/2010 | Juneau et al. |
| 7,889,883 B2 | 2/2011 | Cartwright et al. |
| D635,547 S | 4/2011 | Komiyama |
| 8,027,638 B2 | 9/2011 | Sanguino et al. |
| D656,129 S | 3/2012 | Kelly et al. |
| 8,184,838 B2 | 5/2012 | Solomito et al. |
| 8,201,561 B2 | 6/2012 | Blanchard |
| D667,817 S | 9/2012 | Otani |
| 8,280,093 B2 | 10/2012 | Siahaan et al. |
| D721,354 S | 1/2015 | Thompson et al. |
| 8,931,489 B2 | 1/2015 | Smith |
| D729,764 S | 5/2015 | Arjomand |
| D735,169 S | 7/2015 | Shieh |
| 9,179,211 B2 | 11/2015 | Kirkpatrick |
| D752,026 S | 3/2016 | Yang |
| D754,638 S | 4/2016 | Krissman |
| 9,451,353 B2 | 9/2016 | Kirkpatrick |
| 9,628,889 B2 | 4/2017 | Kirkpatrick |
| 2001/0043708 A1 | 11/2001 | Brimhall |
| 2003/0048916 A1 | 3/2003 | Chen |
| 2003/0099370 A1 | 5/2003 | Moore |
| 2005/0147269 A1 | 7/2005 | Oliveira et al. |
| 2005/0256276 A1 | 11/2005 | Elkin et al. |
| 2006/0098833 A1 | 5/2006 | Juneau et al. |
| 2006/0177082 A1 | 8/2006 | Solomito et al. |
| 2007/0035049 A1 | 2/2007 | Bruce et al. |
| 2008/0041400 A1 | 2/2008 | Darnell |
| 2008/0187161 A1 | 8/2008 | Tiemens et al. |
| 2009/0041287 A1 | 2/2009 | Quinlisk |
| 2009/0190786 A1 | 7/2009 | Miskiel et al. |
| 2009/0232342 A1 | 9/2009 | Oliveira et al. |
| 2009/0252362 A1 | 10/2009 | Ooi et al. |
| 2010/0027824 A1 | 2/2010 | Atamaniuk et al. |
| 2012/0057739 A1 | 3/2012 | Smith et al. |
| 2012/0189146 A1 | 7/2012 | Wuidart |
| 2013/0220385 A1* | 8/2013 | Gil .......................... A61L 2/18 134/105 |
| 2015/0146909 A1* | 5/2015 | Kirkpatrick .......... H04R 25/652 381/380 |
| 2016/0073193 A1 | 3/2016 | Kirkpatrick |

FOREIGN PATENT DOCUMENTS

| | | |
|---|---|---|
| EP | 2107827 | 10/2009 |
| GB | 2470177 | 11/2010 |
| WO | WO 1992/003894 | 3/1992 |
| WO | WO 1999/031935 | 6/1999 |
| WO | WO 00/42817 | 7/2000 |
| WO | WO 2012/024656 | 2/2012 |

OTHER PUBLICATIONS

Chinese Patent Application No. 201380013425.X; 3$^d$ Office Action dated Aug. 2, 2017, 7 pages total.

U.S. Appl. No. 15/411,901, filed Jan. 20, 2017.

Design U.S. Appl. No. 29/599,445, filed Apr. 3, 2017.

What Hi-Fi? Dog & Bone earphones include a heating dock to provide a better fit for your earbuds. Website, http://www.whathifi.com, originally downloaded Feb. 10, 2017, total 5 pages.

Sunshine Coast Daily. Earmade: the little QLD idea on world stage. Website, https://www.sunshinecoastdaily.com.au, total 6 pages.

U.S. Appl. No. 61/596,567, filed Feb. 8, 2012.

U.S. Appl. No. 13/761,947, filed Feb. 7, 2013.

PCT Interantional Patent Application No. PCT/US2013/025288; International Search Report dated Jun. 2, 2013, 11 total pages.

Angell. PodFitKit for Apple earbuds announced. iLounge, website, http://www.ilounge.com, originally downloaded Dec. 31, 2012, 4 total pages.

E-Bay. New SUGRU Black 3 pack Moldable Self Setting Rubber Customize Your Earbuds. Website, http://www.ebay.com, originally downloaded Dec. 31, 2012, 4 total pages.

Fuze Custom Earphones. On-line Catalog, http://www.earfuze.com, originally downloaded Dec. 31, 2012, 1 page.

How-To Geek. How to Make Custom Silicone Ear Molds for Your In-Ear Monitors. Website, http://www.howtogeek.com, originally downloaded Dec. 31, 2012, 20 total pages.

Lloyds. Custom Ear Mold—Standard. On-line Catalog, http://lloydhearingaid.com, originally downloaded Dec. 31, 2012, 1 page.

mylobie.com. Lobies—comfortable earbuds adapters for iPod, iPhone, and portable audio.Website, http://www.mylobie.com, originally downloaded Dec. 31, 2012, 1 page.

Zapconnect. Hearing Aid Moldable Impression Silicone Putty. Website, http://www.zapconnect.com, originally downloaded Dec. 31, 2012, 1 page.

Zenplugs Moulded Earplug Shop. Zenpods Blue Molded Earphone Adaptors . . . On-line Catalog, http://shop.zenplugs.com, originally downloaded Dec. 24, 2013, 1 page.

FLUGZ. Advanced Hearing Protection. Website, https://www.flugz.com, originally downloaded Aug. 17, 2015, 15 pages total.

FLUGZ. Form and Fit. Website, https://www.flugz.com, originally downloaded Aug. 17, 2015, 3 pages total.

FLUGZ. Why FLUGZ. Website, https://www.flugz.com, originally downloaded Aug. 17, 2015, 3 pages total.

FLUGZ. Advanced Hearing Protection. Website, https://www.flugz.com, originally downloaded Aug. 17, 2015, 2 pages total.

European Patent Application No. 13746012.7; European Search Report, dated Jan. 27, 2016, 6 pages total.

Chinese Patent Application No. 201380013425.X; Office Action and Search Report dated Oct. 8, 2016, 8 pages total.

European Patent Application No. 13746012.7; Office Action dated Nov. 18, 2016, 5 pages total.

U.S. Appl. No. 15/411,901, Office Action dated Feb. 2, 2018.

U.S. Appl. No. 15/684,012, filed Aug. 23, 2017.

U.S. Appl. No. 15/707,953, filed Sep. 18, 2017.

(56) References Cited

OTHER PUBLICATIONS

U.S. Appl. No. 16/198,459, Office Action dated Jun. 12, 2019.

* cited by examiner

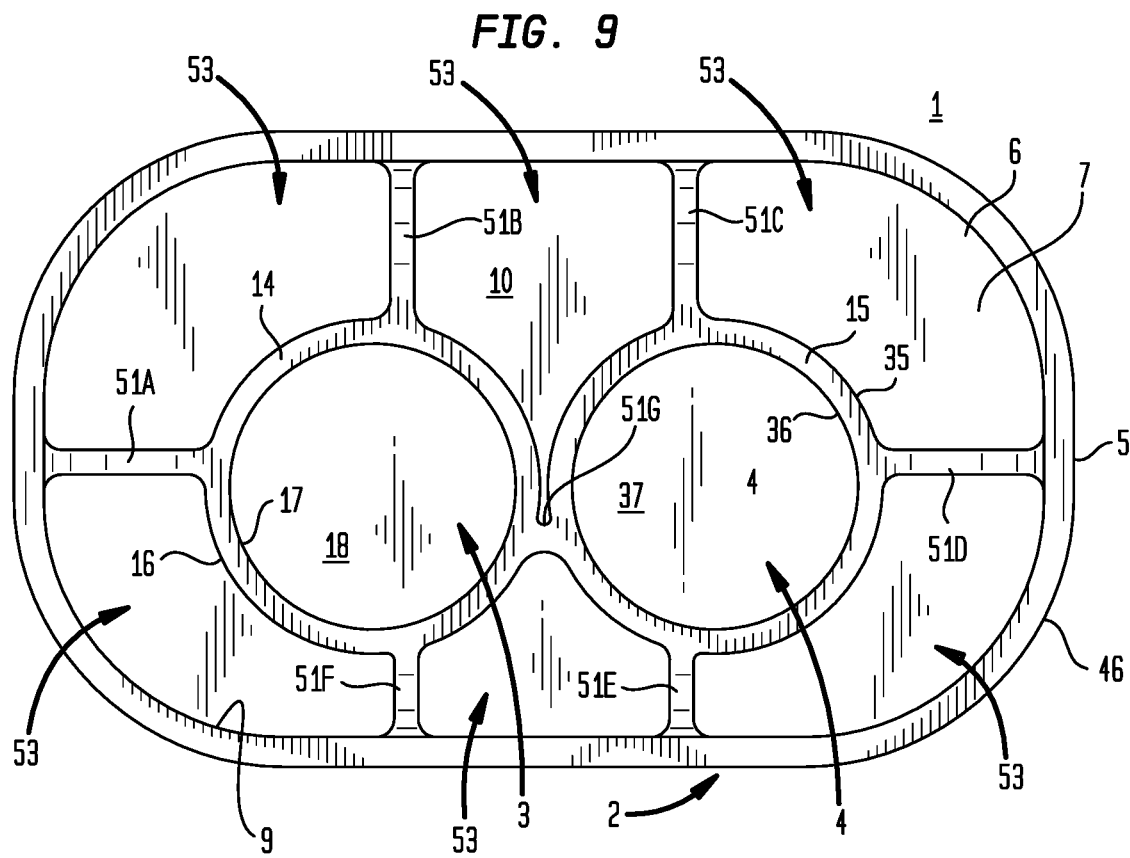
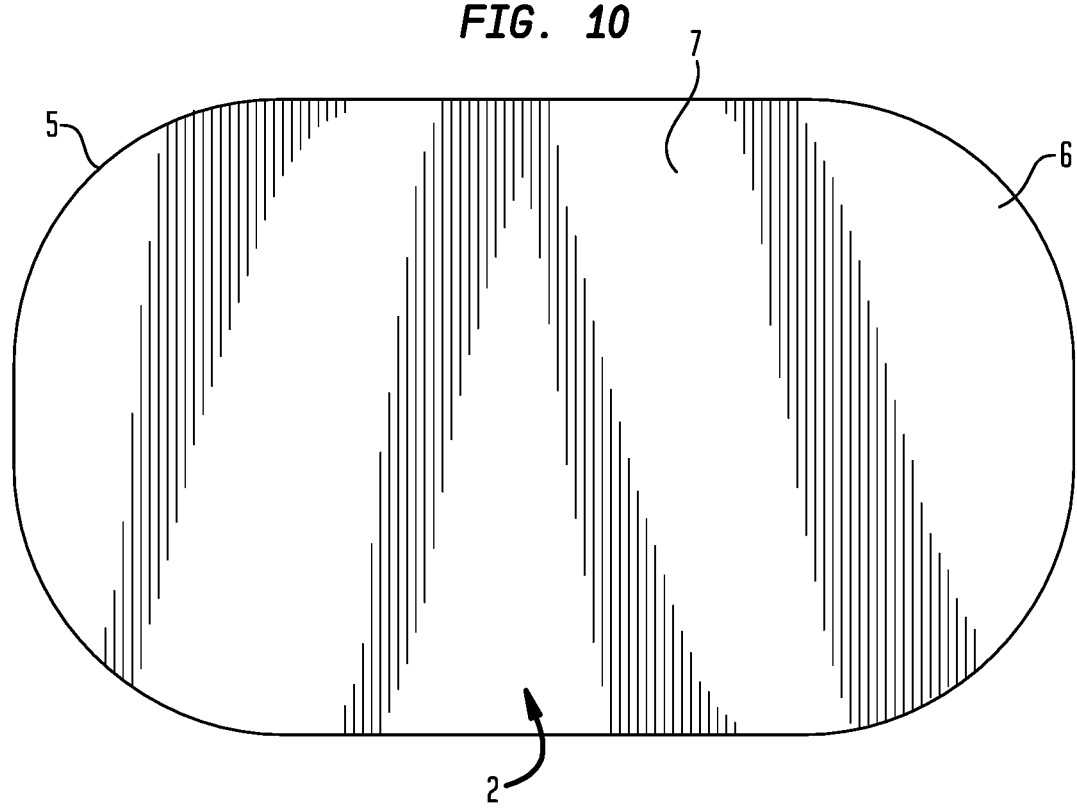

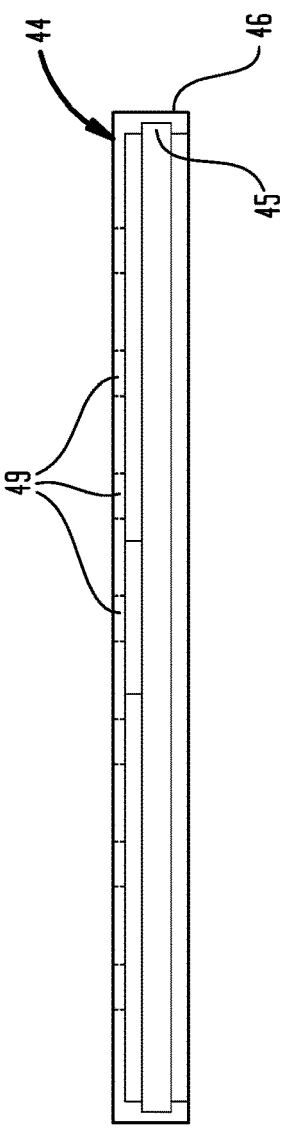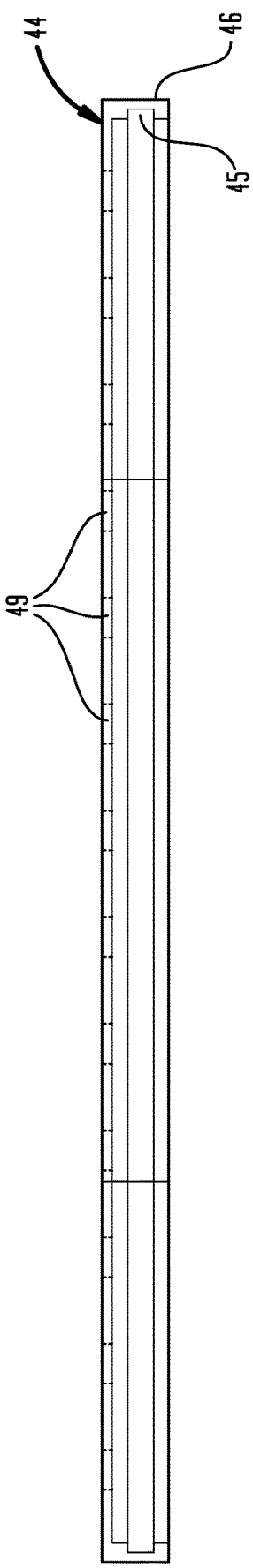

MOLDABLE EARPIECE HEATING CASE

I. FIELD OF THE INVENTION

A moldable earpiece heating case for heating first or second moldable earpieces. The moldable earpiece heating case including a container having a container wall joined about the peripheral margin of a container bottom defining a chamber having within first or second moldable earpiece holders in which first or second moldable earpieces having a fixed configuration can be correspondingly disposed for heating to achieve a moldable condition which allows reconfiguration to fit within the auricle of the ear of a wearer.

II. BACKGROUND OF THE INVENTION

A wide variety of devices to protect against or deliver sound to the ear, such as medical equipment, headsets, hearing aids, cellular telephones, or the like, include in-ear devices such as earphones, earplugs, earbuds, ear tips, ear tubes, or the like, which are not configured to the auricle of an ear of a wearer.

Because conventional in-ear devices are not configured to the auricle of the ear of the wearer, the in-ear device may not stay in fixed engagement with the auricle of the ear, the in-ear device may not align with the external ear canal, or the in-ear device may be uncomfortable for the wearer to insert into or retain in the auricle of the ear.

To provide an earpiece fitted to an auricle of an ear of an individual wearer, a moldable earpiece may be utilized to retain or removably retain an in-ear device. Moldable earpiece materials may be made of viscoelastic polymers which are susceptible to being deformed over time due to stresses placed upon the viscoelastic polymer such as shear and temperature.

The instant invention provides apparatuses and methods of making and using a moldable earpiece heating case to heat moldable earpieces to achieve a moldable condition in which the moldable earpiece can be reconfigured to the configuration of the auricle of an ear of each individual wearer and upon cooling provides an earpiece having a fixed configuration in greater conformity to the auricle of the ear of the wearer.

III. SUMMARY OF THE INVENTION

Accordingly, one object of the invention can be to provide a moldable earpiece heating case including one or more of: a container having a container wall joined about the peripheral margin of a container bottom and an internal surface defining a chamber capable of containing an amount of liquid, a first moldable earpiece holder disposed in the container having a peripheral wall extending from the container bottom and having an external surface configured to engage the amount of liquid disposed in the container, and an internal surface defining a first moldable earpiece holding space configured to receive a first moldable earpiece, and a second moldable earpiece holder disposed in the container having a peripheral wall extending from the container bottom and having an external surface configured to engage the amount of liquid disposed in the container, and an internal surface defining a second moldable earpiece holding space configured to receive a second moldable earpiece.

Another object of the present invention is to provide a method of making a moldable earpiece heating case including one or more of: obtaining a container having a container wall joined about the peripheral margin of a container bottom and an internal surface defining a chamber to contain an amount of liquid, disposing a first moldable earpiece holder in the container, where the first moldable earpiece holder has a peripheral wall extending from the container bottom, an external surface configured to engage the amount of liquid contained in the container, and an internal surface defining a first moldable earpiece holding space configured to receive a first moldable earpiece, and disposing a second moldable earpiece holder in the container, where the second moldable earpiece container has a peripheral wall extending from the container bottom, an external surface configured to engage the amount of liquid contained in the container, and an internal surface defining a second moldable earpiece holding space configured to receive a second moldable earpiece.

Another object of the present invention is to provide a method of using a moldable earpiece heating case including one or more of: obtaining a container having a container wall joined about the peripheral margin of a container bottom and an internal surface defining a chamber to contain an amount of liquid, a first moldable earpiece holder disposed in the container having a peripheral wall extending from the container bottom and having an external surface configured to engage the amount of liquid contained in the container, and an internal surface defining a first moldable earpiece holding space configured to receive a first moldable earpiece, and a second moldable earpiece holder disposed in the container having a peripheral wall extending from the container bottom and having an external surface configured to engage the amount of liquid contained in the container, and an internal surface defining a second moldable earpiece holding space configured to receive a second moldable earpiece, and obtaining at least one of a first or second moldable earpiece, and correspondingly disposing at least one of a first or second moldable earpiece in a first or second moldable earpiece holding space of the first or second moldable earpiece holder, and heating the moldable earpiece heating case.

Another broad object of the present invention is to provide a moldable earpiece kit including one or more of a moldable earpiece heating case including one or more of: a container having a container wall joined about the peripheral margin of a container bottom and an internal surface defining a chamber to contain an amount of liquid, a first moldable earpiece holder disposed in the container having a peripheral wall extending from the container bottom and having an external surface configured to engage the amount of liquid contained in the container, and an internal surface defining a first moldable earpiece holding space configured to receive a first moldable earpiece, and a second moldable earpiece holder disposed in the container having a peripheral wall extending from the container bottom and having an external surface configured to engage the amount of liquid contained in the container, and an internal surface defining a second moldable earpiece holding space configured to receive a second moldable earpiece, and a first and second moldable earpiece.

Naturally, further objects of the invention are disclosed throughout other areas of the specification, drawings, photographs, and claims.

IV. BRIEF DESCRIPTION OF THE DRAWINGS

FIG. 9 is a top view of a particular embodiment of a moldable earpiece heating case.

FIG. 10 is a bottom view of a particular embodiment of a moldable earpiece heating case.

FIG. 19 is a side view of a particular embodiment of a container cover.

FIG. 20 is a front view of a particular embodiment of a container cover.

V. DETAILED DESCRIPTION OF THE INVENTION

Figure 1:
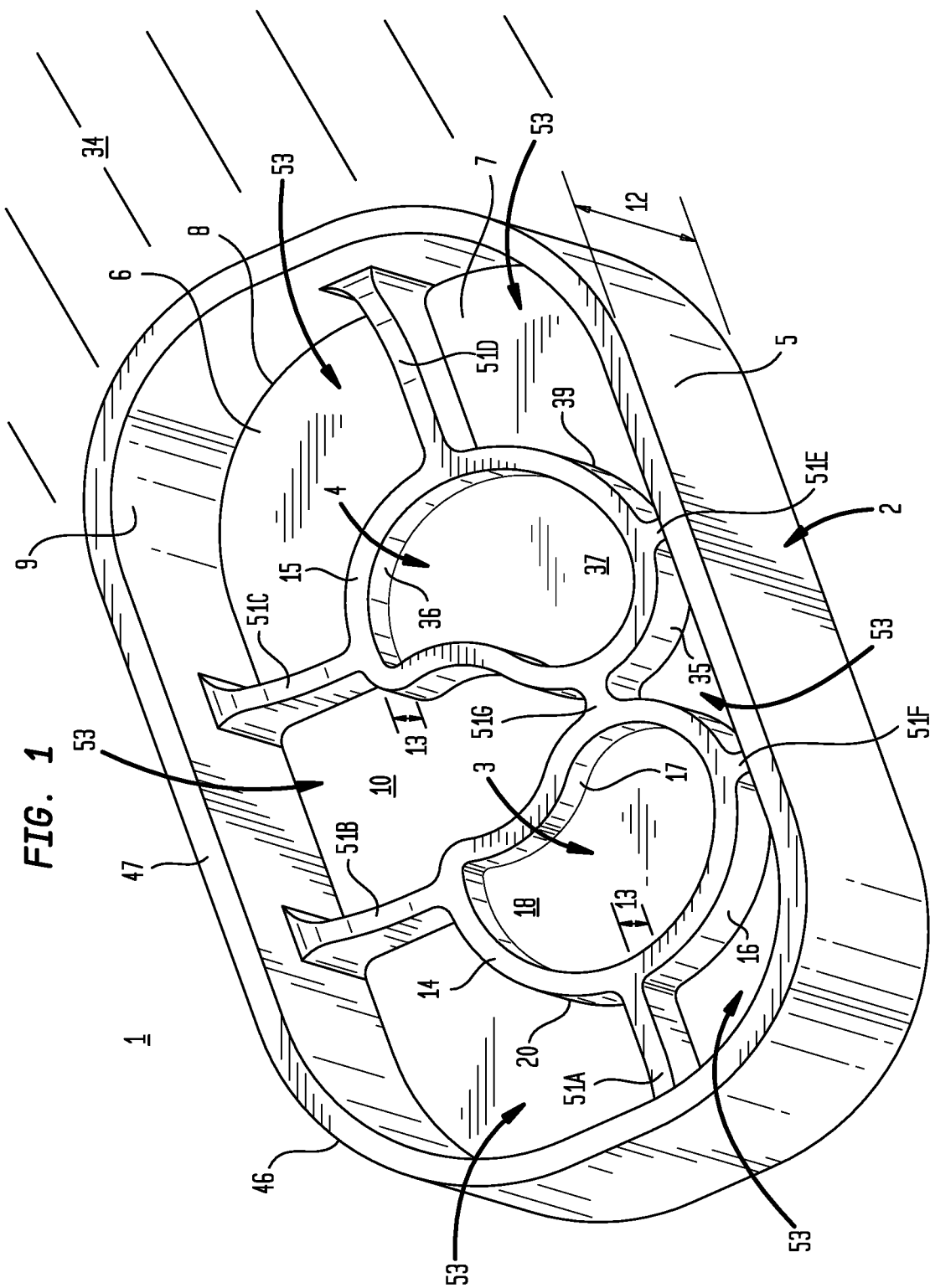
FIG. 1 is a perspective view of a particular embodiment of a moldable earpiece heating case.

With general reference to FIGS. 1 through 20, embodiments of a moldable earpiece heating case (1) can include one or more of: a container (2), a first moldable earpiece holder (3), and a second moldable earpiece holder (4). The container (2) can include a container wall (5) joined about the peripheral margin (6) of a container bottom (7) as one piece, or as two or more pieces where the joints (8) between the two or more pieces remain substantially impermeable to solids and liquids. As illustrated in FIG. 1, the container (2) can, but need not necessarily, have a container wall (5) disposed in a stadium configuration where being a rectangle with semicircles at a pair of opposite sides. However, this illustrative example is not intended to preclude embodiments in which the container wall (5) defines an oval, ellipse, circle, rectangle, or the like. The internal surface (9) of the container (2) can further define a chamber (10) to contain an amount of liquid (11). As illustrative examples, the amount of liquid (11) can comprise or consist of: water, distilled water, salt water, oil, paraffin, or combinations thereof. However, these illustrative examples are not intended to preclude the use of other heatable materials, whether heatable solids, heatable solids convertible to a liquid (11), or other heatable liquids (11).

Figure 15:
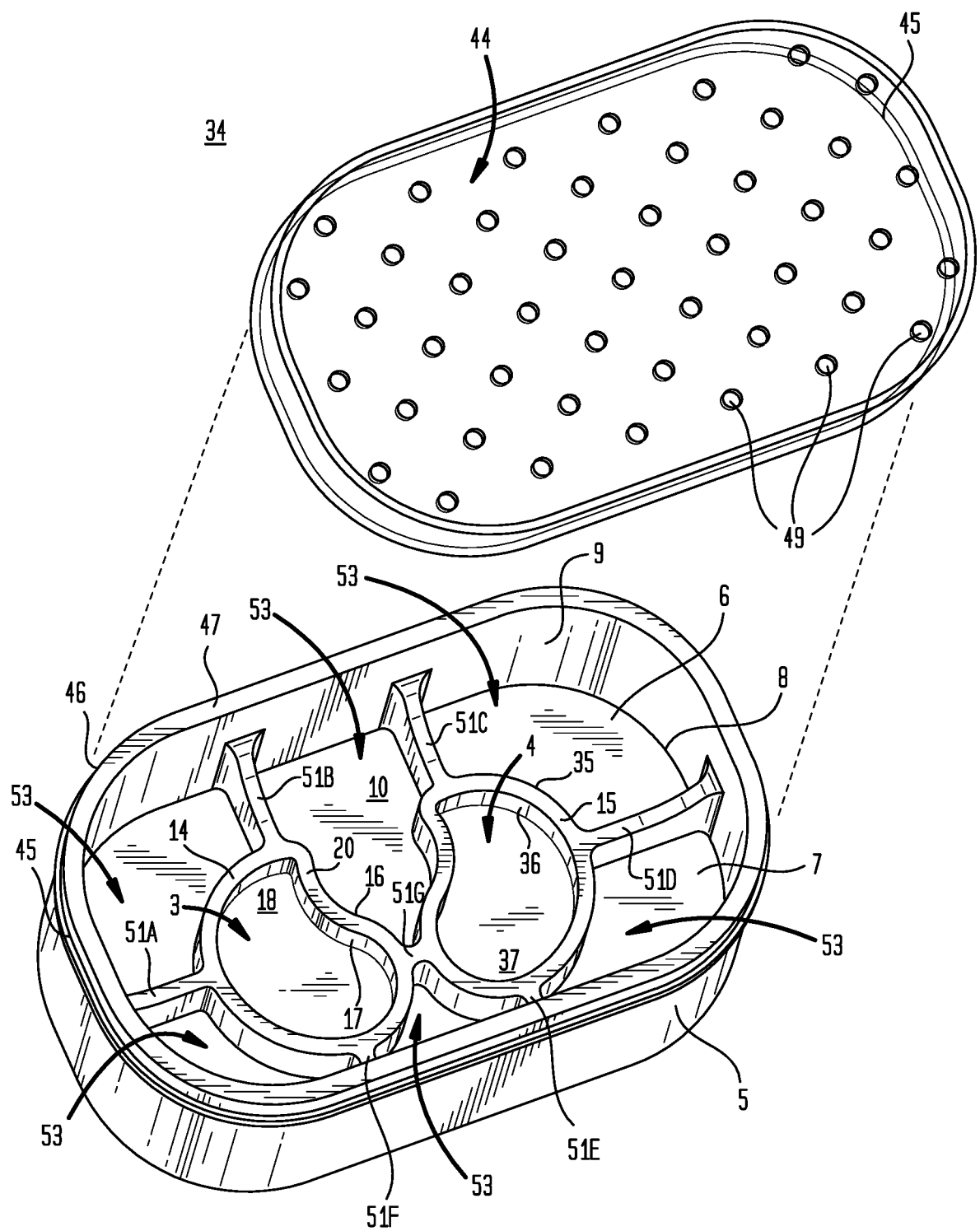
FIG. 15 is an exploded view of a particular embodiment of a moldable earpiece heating case having a container cover.

Now referring primarily to FIGS. 1, 2, 8, 9, and 21, particular embodiments of a moldable earpiece heating case (1) can include a first moldable earpiece holder (3) disposed within the container (2). The first moldable earpiece holder (3) can have a peripheral wall (14) extending from the container bottom (7). The peripheral wall (14) can have an external surface (16) configured to engage the amount of liquid (11) disposed in the container (2) (as shown in the example of FIG. 15) and an internal surface (17) defining a first moldable earpiece holding space (18) configured to receive a first moldable earpiece (19). The peripheral wall (14) can be integrated with the container bottom (7) as one piece where the joint (20) between the container bottom (7) and the peripheral wall (14) can be substantially impermeable to the amount of liquid (11) disposed in the container (2), or can be engaged to the container bottom (7) as a discrete piece.

As to particular embodiments, the first moldable earpiece holder (3) can have an internal surface (17) configured to conform to the peripheral face (21) of the first moldable earpiece (19). As shown the illustrative example of FIG. 15, the peripheral face (21) of the first moldable earpiece (19) can generally comprise a circular peripheral face (22) and the internal surface (17) of the peripheral wall (14) of the first moldable earpiece holder (3) can generally comprise a circular internal surface (23). The first moldable earpiece (19) can be disposed in the first moldable earpiece holder (3), where the circular peripheral face (22) can be in substantially continuous adjacent or adjacent parallel relation to the circular internal surface (23) of the peripheral wall (14) of the first moldable earpiece holder (3).

Figure 2:
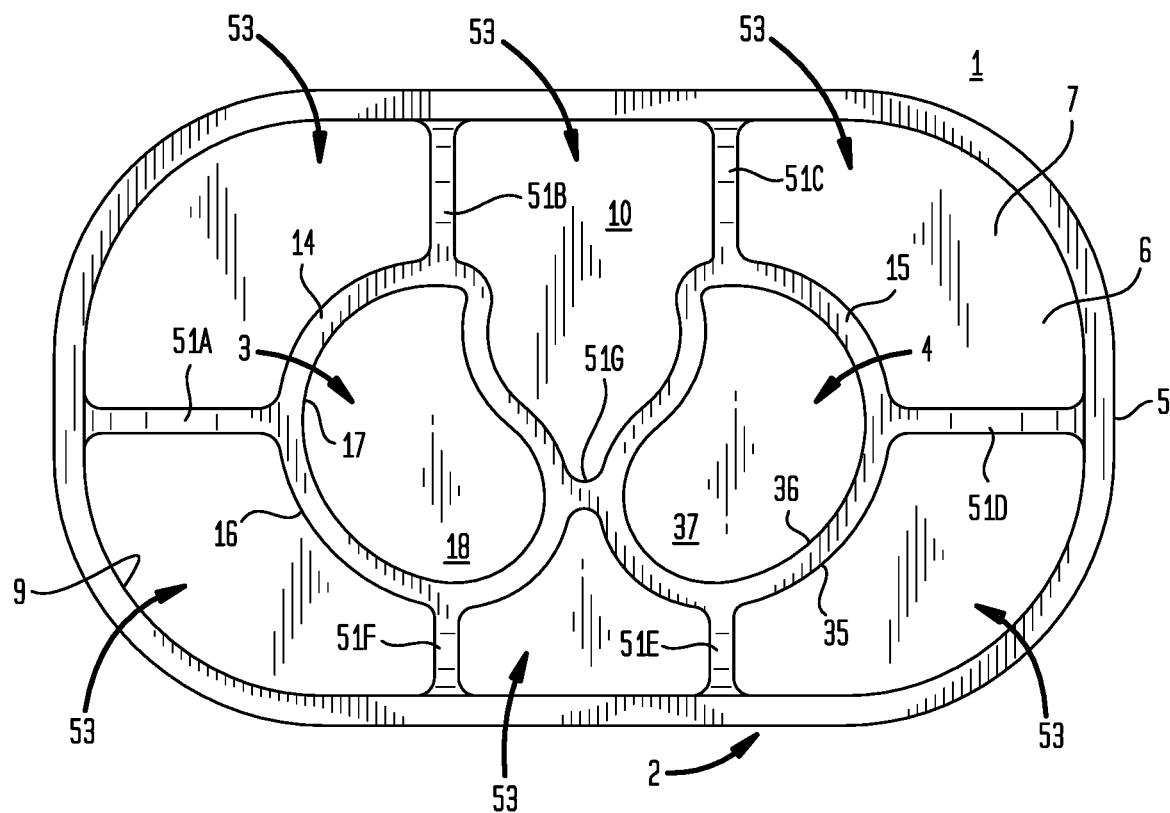
FIG. 2 is a top view of a particular embodiment of a moldable earpiece heating case.
Figure 3:
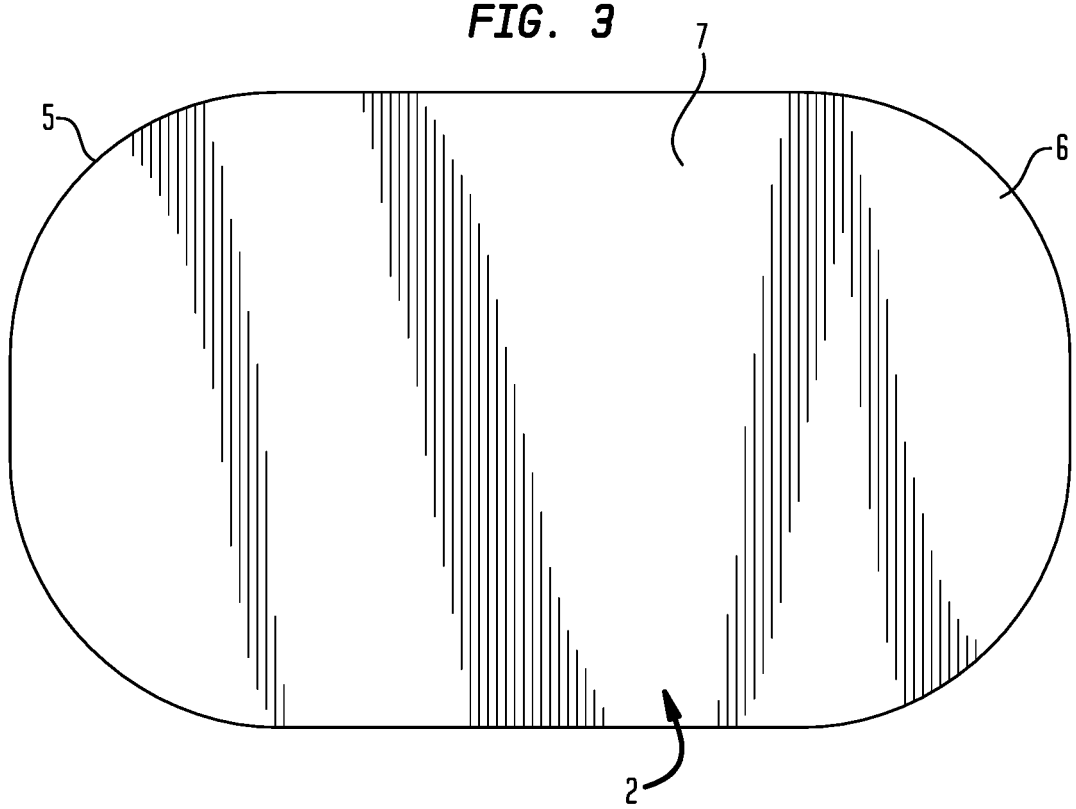
FIG. 3 is a bottom view of a particular embodiment of a moldable earpiece heating case.
Figure 4:
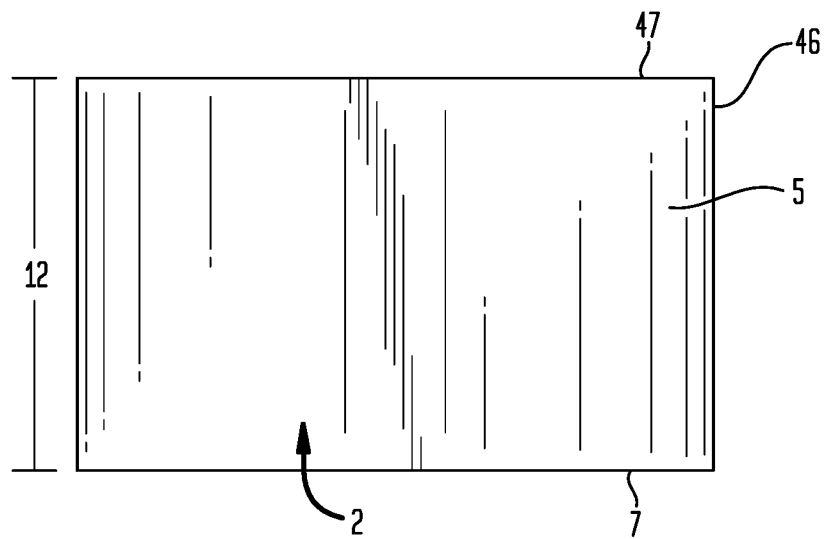
FIG. 4 is a first side view of a particular embodiment of a moldable earpiece heating case.
Figure 5:
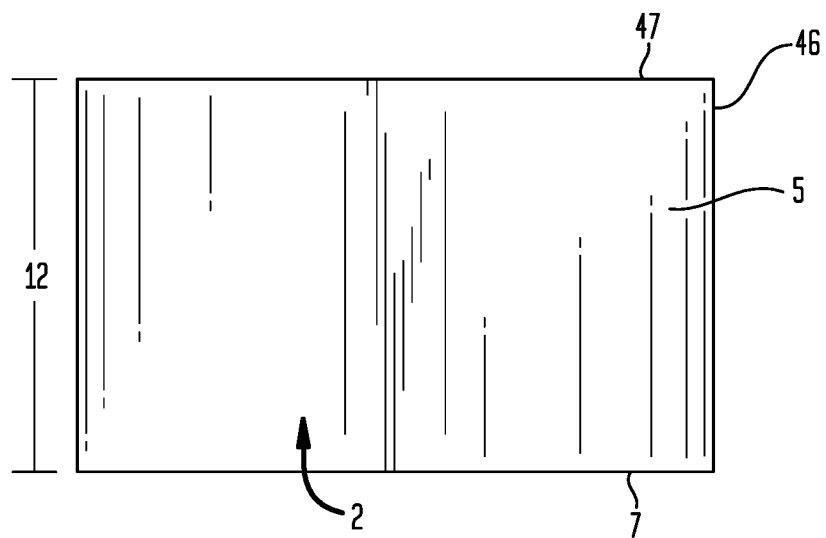
FIG. 5 is second side view of a particular embodiment of a moldable earpiece heating case.
Figure 6:
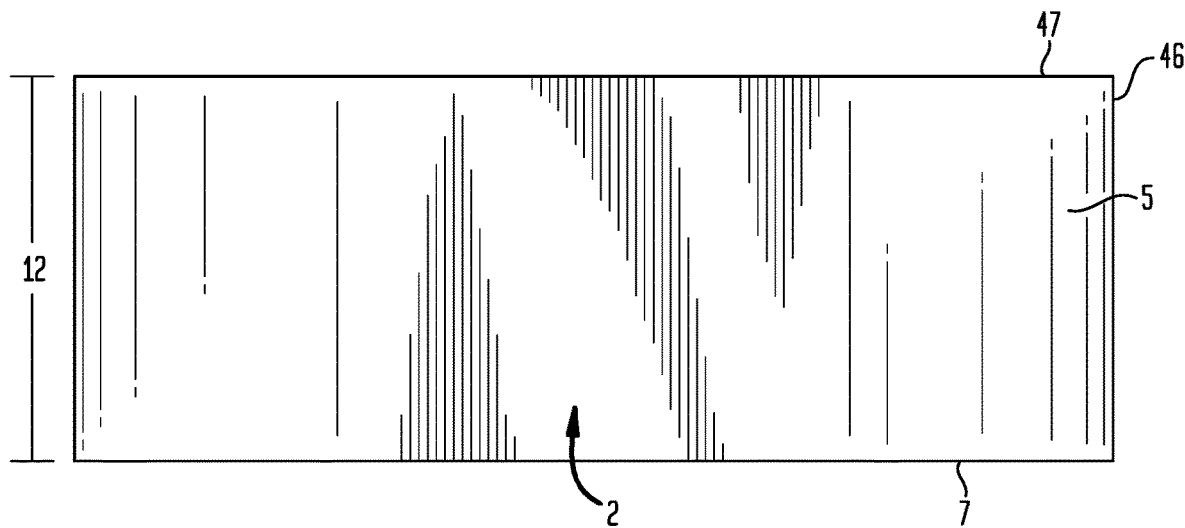
FIG. 6 is a front view of a particular embodiment of a moldable earpiece heating case.
Figure 7:
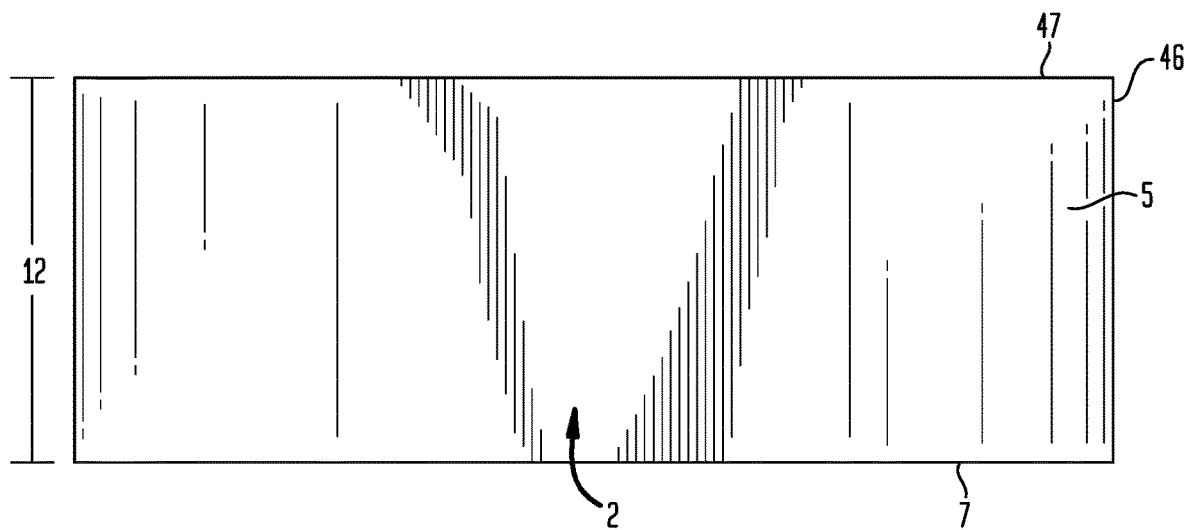
FIG. 7 is a back view of a particular embodiment of a moldable earpiece heating case.
Figure 23:
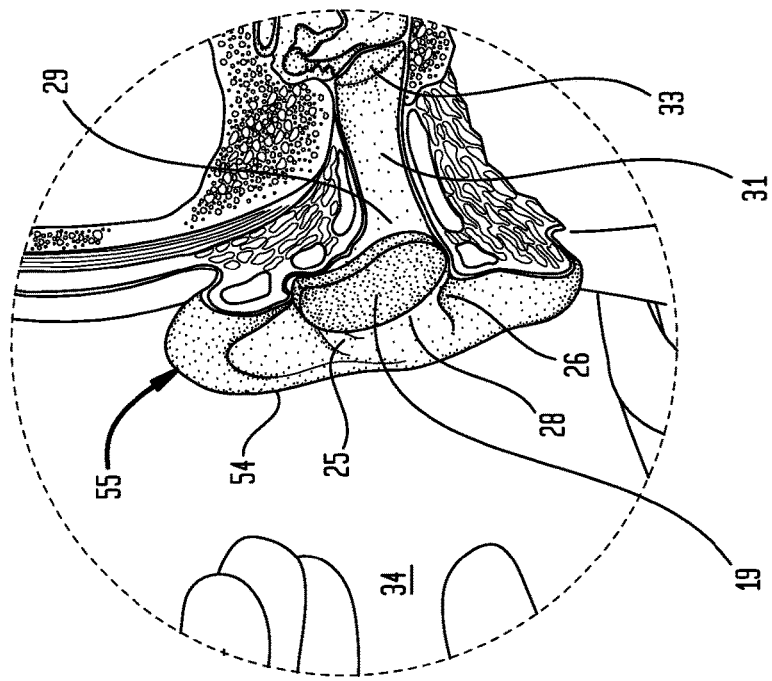
FIG. 23 is an illustration of a cross section of the ear showing the moldable earpiece molded to engage the auricle of the ear of a wearer.

As to other particular embodiments, the first moldable earpiece holder (3) can, but need not necessarily, have an internal surface (17) configured to define a first moldable earpiece holding space (18) generally configured to mimic the anatomical structure of a concha bowl (24) of the ear (55)(57), as shown in the examples of FIGS. 2 and 23. The term concha bowl (24), as used in this description, means the space defined by the antihelix (25), antitragus (26), tragus (27), concha of the ear (28), and external ear canal opening (29). For purposes of this description, the term external ear canal opening (29) means the opening of the external ear canal (31) communicating with the surrounding environment (34). For the purposes of this description the term "external ear canal" (31) means the canal disposed between the tympanic membrane (33) and the external ear canal opening (29).

These examples of the first moldable earpiece holder (3) are not intended to preclude other embodiments of the first moldable earpiece holder (4) and internal surface (17) defining a corresponding first moldable earpiece holding space (18) which can be configured in a numerous and wide variety of configurations such as hemispherical; circular, oval, square or rectangular tube; or other configuration capable of receiving the first moldable earpiece (19).

Again, referring primarily to FIGS. 1, 2, 8, 9, and 21, particular embodiments can include a second moldable earpiece holder (4) disposed within the container (2). The second moldable earpiece holder (3) can have a peripheral wall (15) extending from the container bottom (7). The peripheral wall (15) can further have an external surface (35) configured to engage the amount of liquid (11) disposed in the container (2) and an internal surface (36) defining a second moldable earpiece holding space (37) configured to receive a second moldable earpiece (38)(as shown in the example of FIG. 15). The peripheral wall (15) can be integrated with the container bottom (7) as one piece, or can be engaged to the container bottom (7) as a discrete piece, where the joint (39) between the container bottom (7) and the peripheral wall (15) can be substantially impermeable to the amount of liquid (11) disposed in the container (2), or can be engaged to the container bottom (7) as a discrete piece.

Figure 21:
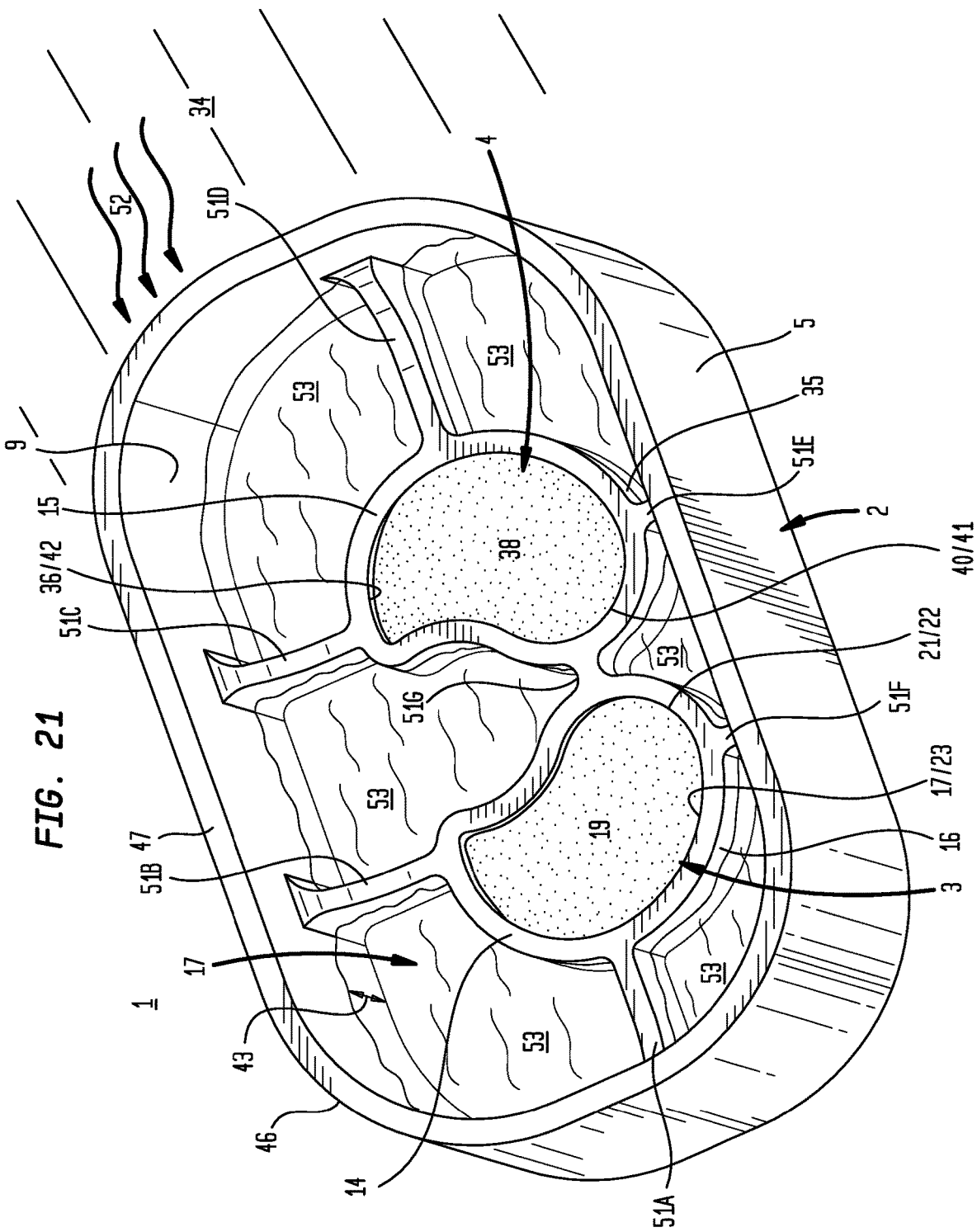
FIG. 21 is a perspective view of a particular embodiment of a method of using a moldable earpiece heating case.

Again referring primarily to FIGS. 1, 2, 8, 9 and 21, the second moldable earpiece holder (4) can have an internal surface (36) of the peripheral wall (15) configured to conform to the peripheral face (40) of the second moldable earpiece (38) (as shown the example of FIG. 21). As an illustrative example, the peripheral face (40) of the second moldable earpiece (38) can generally comprise a circular peripheral face (41) and the internal surface (36) of the peripheral wall (15) can generally comprise a circular internal surface (42)(as shown in the example of FIG. 9). The second moldable earpiece (38) can be disposed in the second moldable earpiece holder (4), where the circular peripheral face (41) can be in substantially continuous adjacent relation to the circular internal surface (42) of the peripheral wall (15) of the second moldable earpiece holder (4). In further particular embodiments, the second moldable earpiece holder (4) can, but need not necessarily, be generally configured to mimic the anatomical shape of the concha bowl (24) of the ear, as shown in the example of FIGS. 2 and 23. These examples of the second moldable earpiece holder (4) are not intended to preclude other embodiments of the second moldable earpiece holder (4) and corresponding second moldable earpiece holding space (37) which can be configured in a numerous and wide variety of configurations such as a cylindrical or oval tube, a cup, a square, or other configuration capable of receiving the second moldable earpiece (38).

Now referring primarily to FIGS. 1 and 15, as to particular embodiments, the peripheral face (21) of the first moldable earpiece (19) and the peripheral face (40) of the second moldable earpiece can (38), but need not necessarily, have left and right handed mirror image symmetry. The internal surfaces (17)(36) of the peripheral walls (14)(15) of each of the first and second moldable earpiece holder (3)(4) can have left and right handed mirror image symmetry to correspondingly receive the left and right handed mirror image symmetry of the peripheral face (21) of the first moldable earpiece (19) and the peripheral face (40) of the second moldable earpiece (38). The peripheral faces (22) (41) of each of the first and second moldable earpieces (19)(38) having right and left handed mirror image symmetry can be disposed in substantially continuous adjacent or parallel adjacent relation to the corresponding peripheral walls (14)(15) of the first or second moldable earpiece holders (3)(4).

The moldable earpiece heating case (1) can be fabricated, molded, or formed from any material which can maintain the above described configurations when heated to a temperature which achieves the moldable condition of the first or second moldable earpieces (19)(38), or as to those particular embodiments in which the moldable earpiece heating case (1) contains an amount of liquid (11) or other material used to confer heat to the first or second moldable earpieces (19)(38), the temperature at which the amount of liquid (11) or other material confers sufficient heat to the first or second moldable earpieces (19)(38) to achieve the moldable condition of the first or second moldable earpieces (19)(38). Accordingly, the moldable earpiece case (1) can be fabricated, molded or formed from a wide variety of rigid or elastic thermoplastics including or consisting of: acrylic, nylon, acrylonitrile butadiene styrene, polylactic acid, polybenzimidzole, polycarbonate, polyether sulfone, polyethylene, urethane, silicone, wood, metal, or combinations thereof. The material comprising the first or second moldable earpiece (19)(38) can include or consist of one or more of: ethyl vinyl acetate, polycaprolactone, silicone, or like thermoplastic materials.

As one illustrative example, the first or second moldable earpiece (19)(38) can be an amount of polycaprolactone polymer (CAS No.: 24989-40-4); however, other thermoplastic polymers suitable for use with embodiments of the invention can have physical properties as those described in Table 1 for polycaprolactone polymer, or similar physical properties which allow the material to be utilized in one or more of the embodiments of the first or second moldable earpiece (19)(38).

TABLE 1

| Physical Properties of Polycaprolactone Thermoplastic Polymers | | | | |
|---|---|---|---|---|
| Physical Property | ASTM Test | | | |
| Molecular Weight | | | | |
| Mn | GPC, THF, 25° C. | 37,000 ± 2000; | 47500 ± 2000; | 69000 ± 1500 |
| Mw | GPC, THF, 25° C. | | 84500 ± 1000; | 120000 ± 2000 |
| Mz | GPC, THF, 25° C. | | 130000 ± 5000; | 178500 |
| Polydispersity (Mw/Mn) | | | 1.78 | 1.74 |
| Melt Flow Index | D 1238 | | | |
| 80° C., 2.16 kg, g/10 min | | | 2.36 | 0.59 |
| 80° C., 21.6 kg, g/10 min | | | 34.6 | 9.56 |
| 190° C., 2.16 kg, g/10 min | | | 28 | 7.29 |
| Thermal Analysis (DSC) | | | | |
| Melting Point ° C. | | | 60-62 | 60-62 |
| Heat Of Fusion, DHm, J/g | | | 76.9 | 76.6 |
| Crystallinity, % | | | 56 | 56 |
| Crystallisation Temperature, ° C. | | | 25.2 | 27.4 |
| Glass Transition Temperature, Tg,° C. | | | −60 | −60 |
| Tensile Properties | | | | |
| Yield Stress, s y, Mpa | D 412-87 | | | |
| 100 mm/min | | | 17.5 | 16 |

TABLE 1-continued

Physical Properties of Polycaprolactone Thermoplastic Polymers

| | | | |
|---|---|---|---|
| 500 mm/min | | 17.2 | 14 |
| Modulus, E. Mpa | D 412-87 | | |
| 1 mm/min | | 470 | 440 |
| 10 mm/min | | 430 | 500 |
| Draw Stress,s d, MPa | D 412-87 | | |
| 100 mm/min | | 12.6 | 11.9 |
| 500 mm/min | | 11.5 | 11 |
| Draw Ratio, 1 d, x | D 412-87 | | |
| 100 mm/min | | >4.2 | 4 |
| Stress At Break,s b, Mpa | D 412-87 | | |
| 100 mm/min | | 29 | 54 |
| Strain At Break, e b, % | | | |
| 100 mm/min | D 412-87 | >700 | 920 |
| Flexural Modulus, E, MPa | | | |
| 2 mm/min | D 790 | 411 | nd |
| Hardness | D 2240 | | |
| Shore A | | 95 | 94 |
| Shore D | | 51 | 50 |
| Viscosity | | | |
| Pa · sec, 70° C.,10 1/sec | | 2890 | 12650 |
| Pa · sec, 100° C.,10 1/sec | | 1353 | 5780 |
| Pa · sec, 150° C.,10 1/sec | | 443 | 1925 |

Polycaprolactone polymers can be heated to achieve a moldable condition. Polycaprolactone polymers impart good water, oil, solvent, and chlorine resistance. Polycaprolactone polymers are also compatible with a wide range of other materials (collectively referred to as "admixed agents"), such as: starch, to impart greater biodegradability; colorants, such as alcohol dyes or acrylic coloring agents; powders, such as acrylic powder; particulates of plastic, copolymer plastics, metal, bismuth oxychloride, or glitter, or the like, either separately or in various combinations. Polycaprolactone polymers are non-toxic and approved by the United States Food and Drug Administration for specific applications in the human body.

Now referring primarily to FIG. 21, particular embodiments of the moldable earpiece heating case (1) can contain an amount of liquid (11) (or a heatable solid material), as described above. The liquid height (43) of the amount of liquid (11) contained within the chamber (10) can be less than, greater than, or substantially equal to the peripheral wall height (13) of the peripheral walls (14)(15) of the corresponding first or second moldable earpiece holder (3)(4). The amount of liquid (11) can further have a temperature of between about 55° C. to about 110° C. The type and temperature of the amount of liquid (11) can vary depending the material of the first and second moldable earpieces (19)(38). The temperature of the amount of liquid (11) can further be selected from the group consisting of: about 56° C. to about 60° C., about 57.5° C. to about 62.5° C., about 60° C. to about 65° C., about 62.5° C. to about 67.5° C., about 65° C. to about 70° C., about 67.5° C. to about 72.5° C., about 70° C. to about 75° C., about 72.5° C. to about 77.5° C., about 75° C. to about 80° C., about 77.5° C. to about 82.5° C., about 80° C. to about 85° C., about 82.5° C. to about 87.5° C., about 85° C. to about 90° C., about 87.5° C. to about 92.5° C., about 90° C. to about 95° C., about 92.5° C. to about 97.5° C., about 95° C. to about 100° C., about 97.5° C. to about 102.5° C., about 100° C. to about 105° C., about 102.5° C. to about 107.5° C., and about 105° C. to about 109° C.

Figure 16:
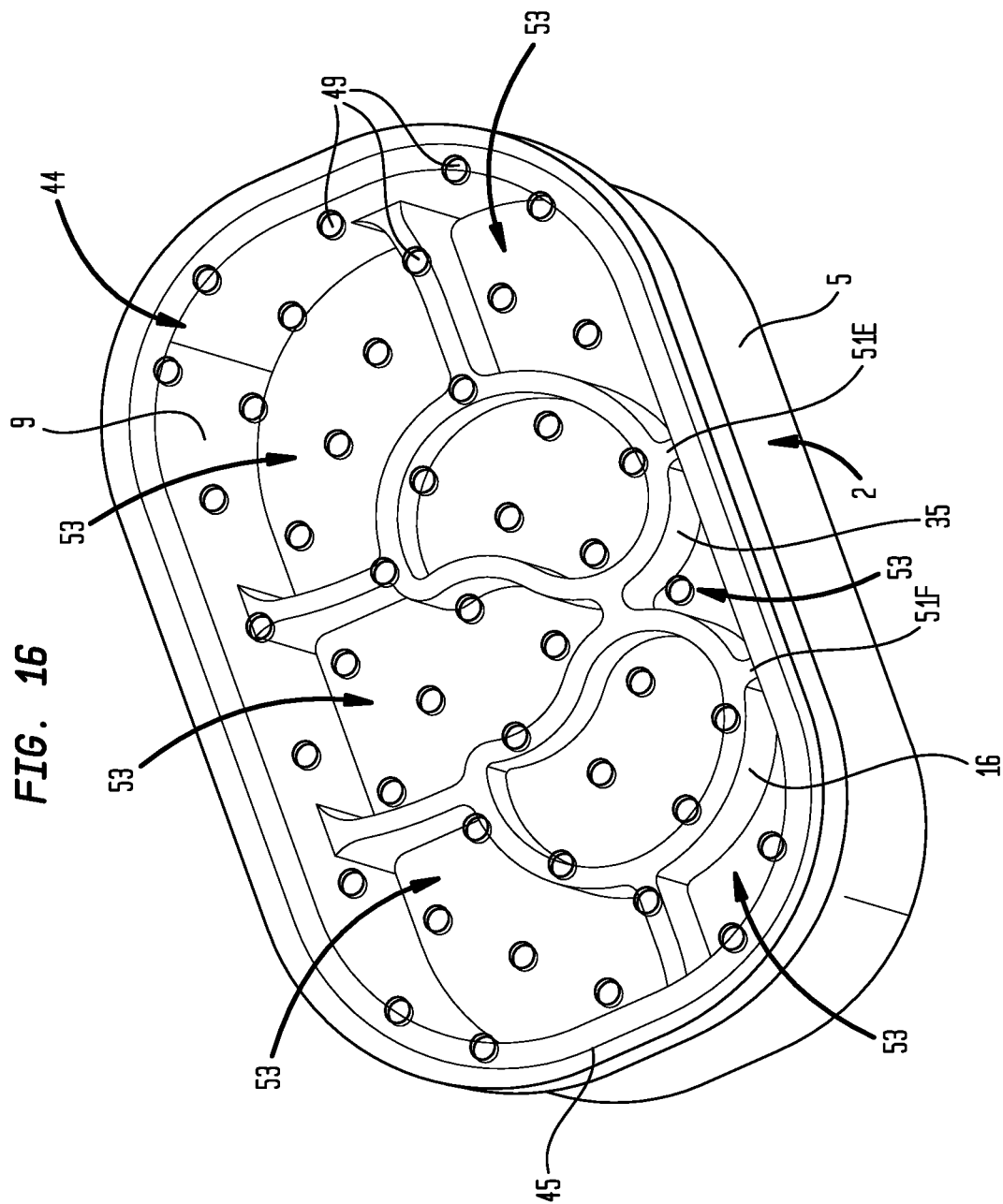
FIG. 16 is second perspective view of a particular embodiment of a moldable earpiece heating case having a container cover.
Figure 17:
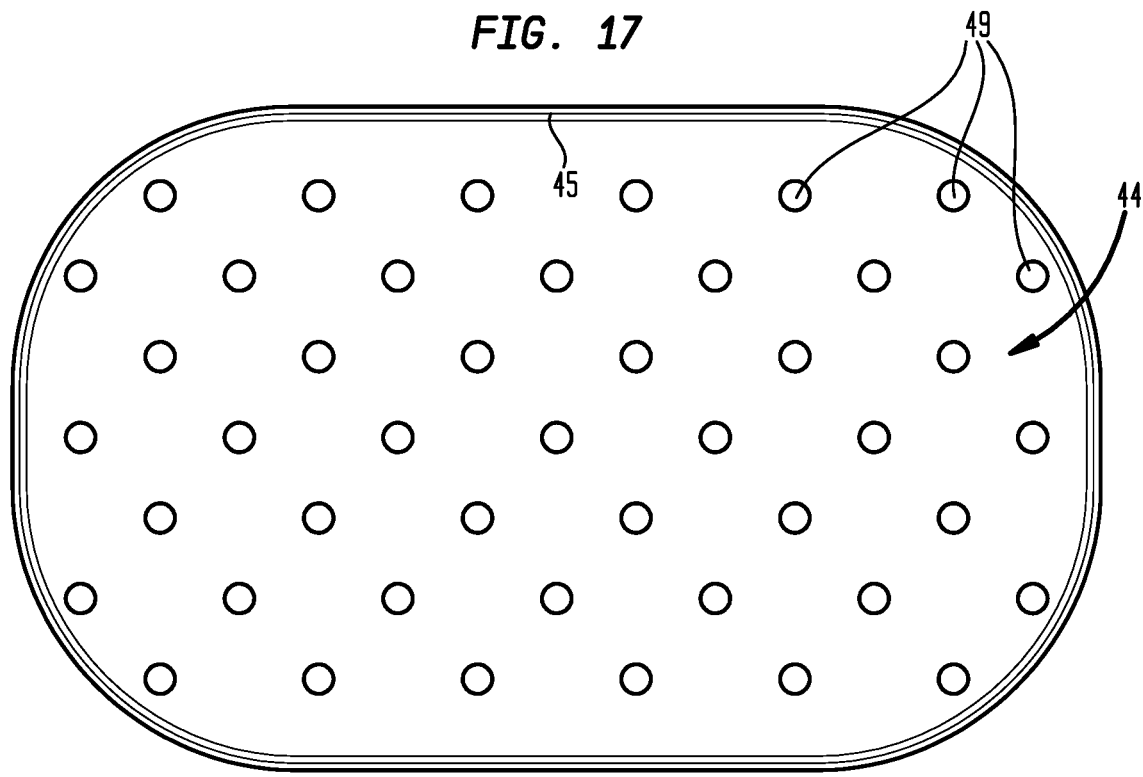
FIG. 17 is a top view of a particular embodiment of a container cover.
Figure 18:
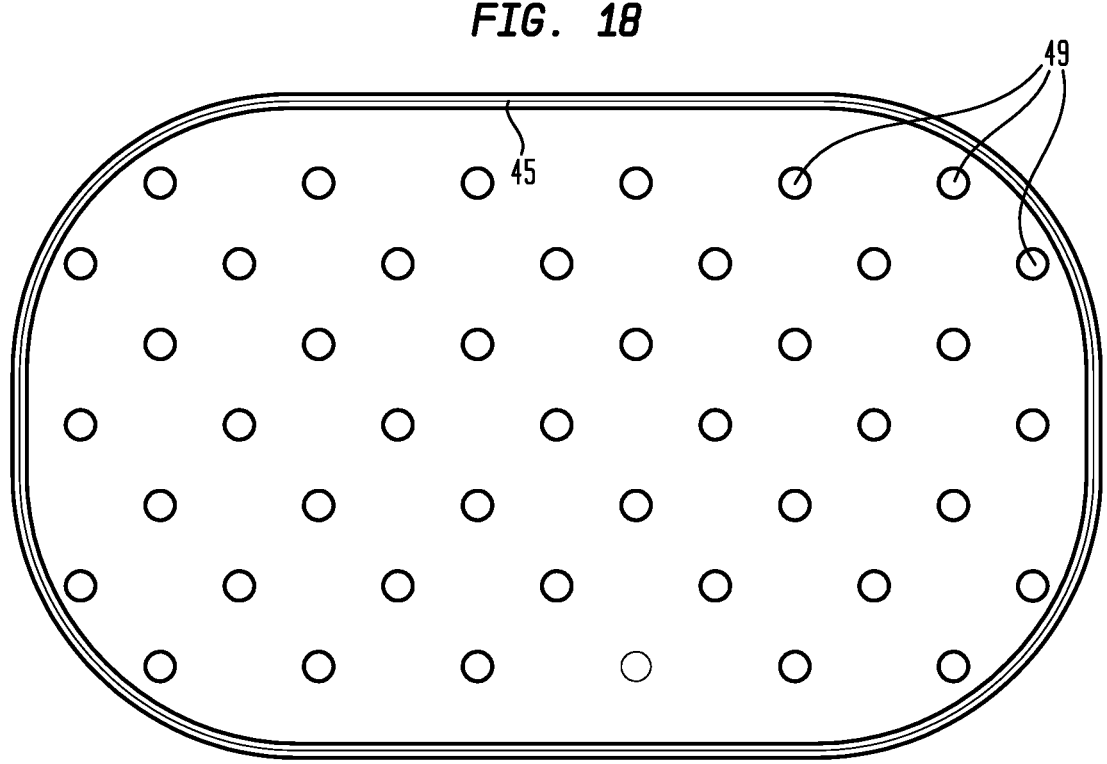
FIG. 18 is a bottom view of a particular embodiment of a container cover.

Now referring primarily to FIGS. 15 through 20, further particular embodiments of the moldable earpiece heating case (1) can include a container cover (44) which can be removably coupled to the container wall (5). The container cover (44) can, but need not necessarily, have a configuration similar to the container bottom (7) and the top edge (47) of the container wall (5). As to particular embodiments, the container cover (44) can be larger than the area of the container bottom (7) and be positionally engaged with the top edge (47) of the container wall (5). In yet other particular embodiments, the container cover (44) can be configured to matingly engage the top edge (47) of the container wall (5) by disposing interlocking threads (45) about the outer peripheral margin (46) of the container wall (5) proximate the top edge (47) and the inner peripheral margin (48) of the container cover (44) (as shown in FIGS. 15 and 16). In yet other particular embodiments, the container cover (44) can engage the container wall (5) by disposing tabs on the container cover (44) which fit within slots disposed in the container wall (5), or other like configurations.

Again referring primarily to FIGS. 15 through 20, the container cover (44) can further include one or more aperture elements (49). The aperture elements (49) can communicate between the chamber (10) and the surrounding environment (34). Configurations of the aperture elements (49) can include one or more slits, geometrically-shaped holes (e.g. circles, squares, triangles, etc.), or other like configurations. The container cover (44) can comprise a wide variety of rigid or elastic thermoplastics including or consisting of: acrylic, nylon, acrylonitrile butadiene styrene, polylactic acid, polybenzimidzole, polycarbonate, polyether sulfone, polyethylene, urethane, silicone, wood, metal, or combinations thereof.

Figure 8:
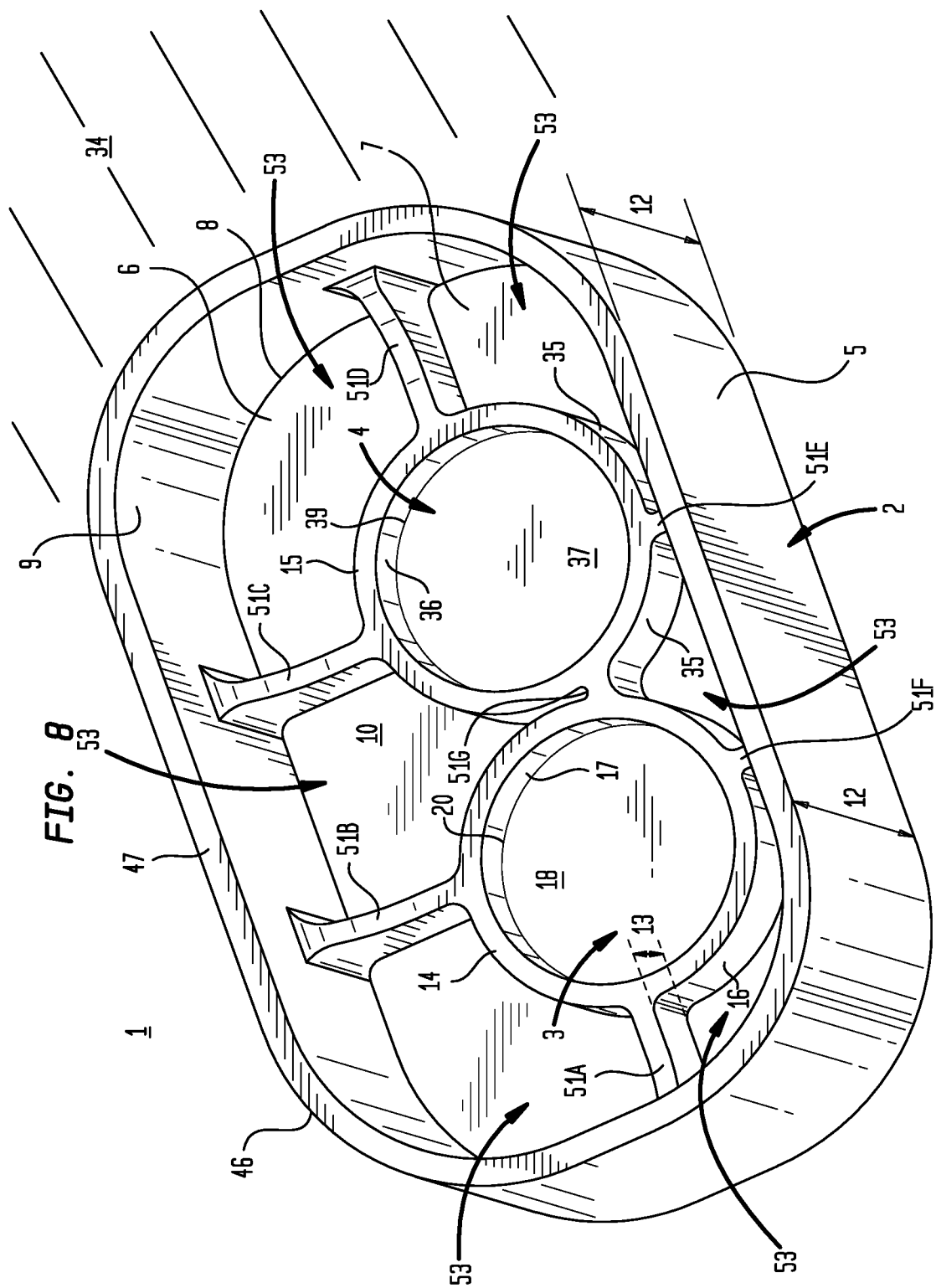
FIG. 8 is a perspective view of a particular embodiment of a moldable earpiece heating case.
Figure 11:
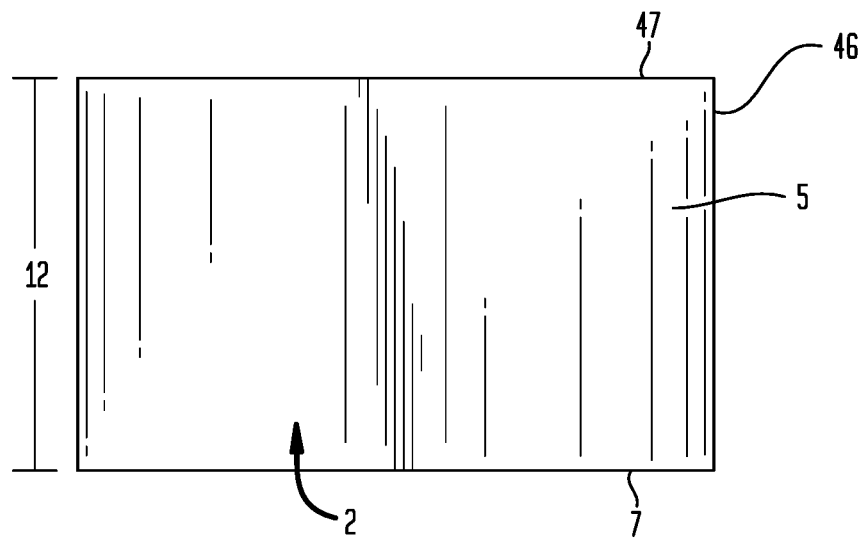
FIG. 11 is a first side view of a particular embodiment of a moldable earpiece heating case.
Figure 12:
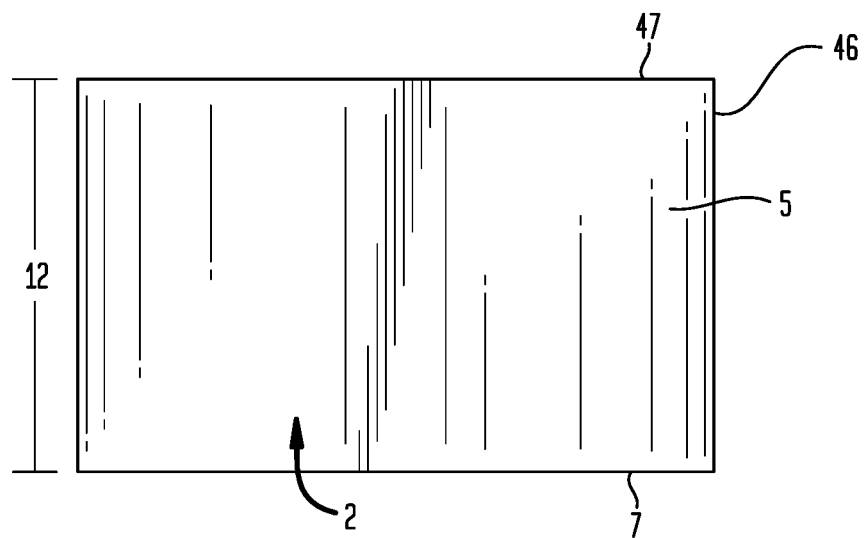
FIG. 12 is second side view of a particular embodiment of a moldable earpiece heating case.
Figure 13:
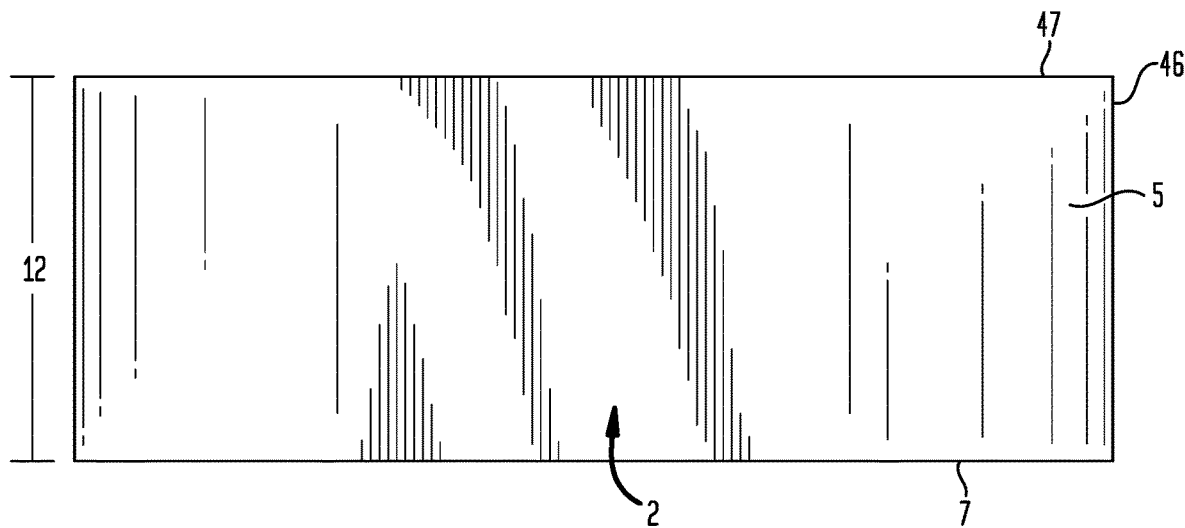
FIG. 13 is a front view of a particular embodiment of a moldable earpiece heating case.
Figure 14:
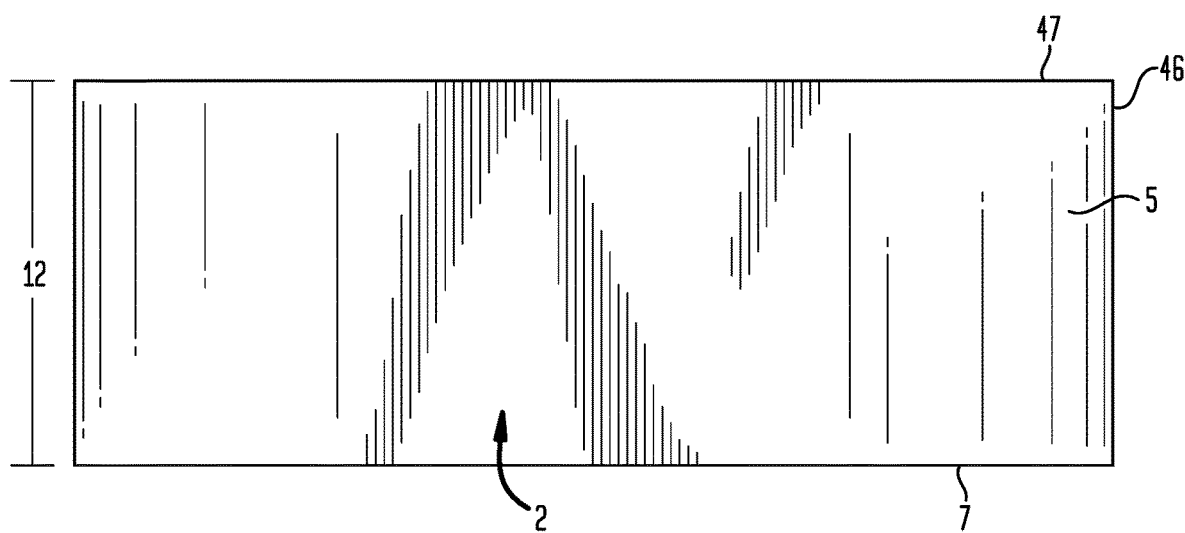
FIG. 14 is a back view of a particular embodiment of a moldable earpiece heating case.

Now referring to FIGS. 1 and 8, particular embodiments of the moldable earpiece heating case (1) can, but need not necessarily, include one or more partition walls (51A, 51B, 51C, 51D, 51E) disposed in the container (2). Each of the one or more partition walls (51A, 51B, 51F) can extend from the container bottom (7) and be disposed between the internal surface (9) of the container wall (5) and the external surface (16) of the first moldable earpiece holder (3). Embodiments, can further include one or more partition walls (51C, 51D, 51E) extending from the container bottom (7) and disposed between the internal surface (9) of the container wall (5) and the external surface (35) of the second moldable earpiece holder (4). In yet further embodiments, each of one or more partition walls (51G) can also, but need not necessarily, extend from the container bottom (7) and be disposed between the external surfaces (16)(35) of the first and second moldable earpiece holders (3)(4). Materials comprising the one or more partition walls (51A, 51B, 51C, 51D, 51E) can include a wide variety of rigid or elastic thermoplastics including, but not necessarily limited to, acrylic, nylon, acrylonitrile butadiene styrene, polylactic acid, polybenzimidzole, polycarbonate, polyether sulfone, polyethylene, urethane, silicone, wood, metal, or combinations thereof.

Figure 22:
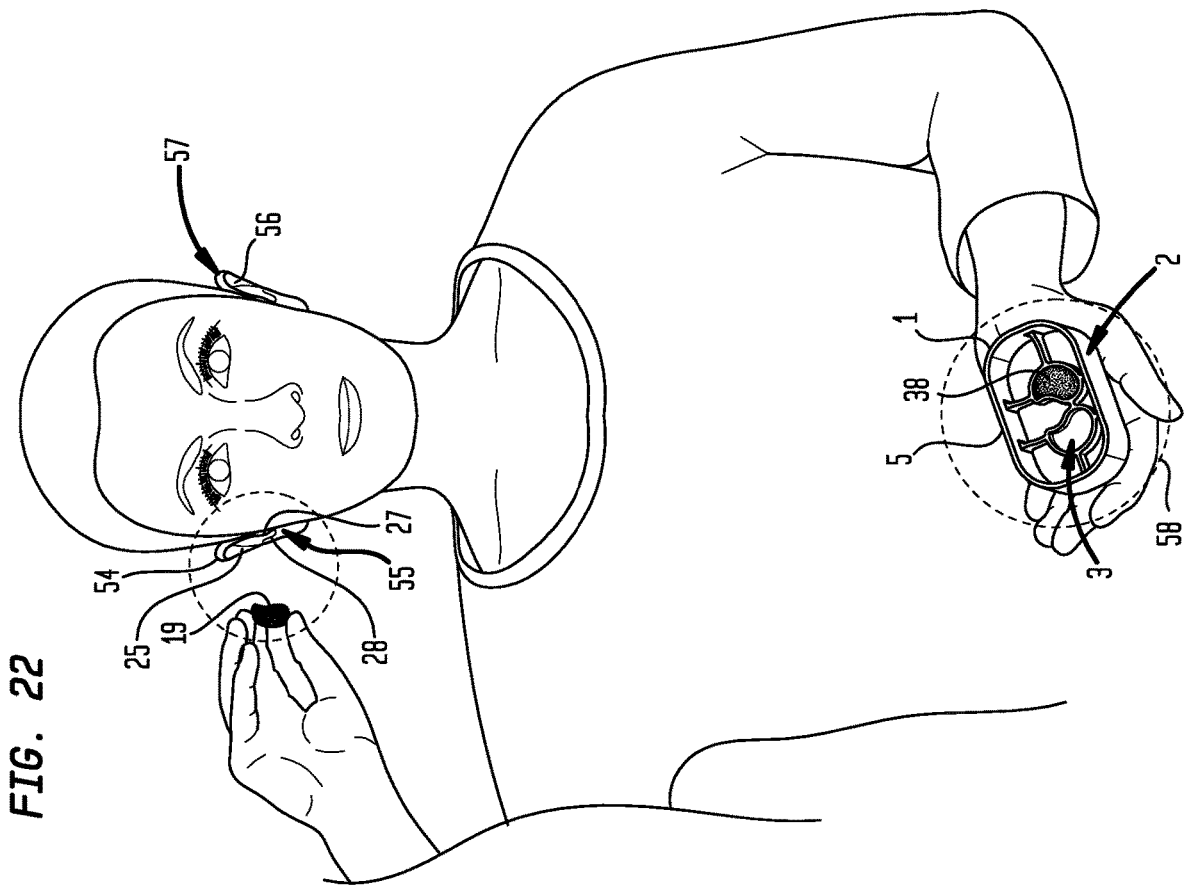
FIG. 22 is an illustration of a particular embodiment of a method of removing a moldable earpiece from a particular embodiment of the moldable earpiece heating case in which the moldable earpiece has been heated to achieve a moldable condition which can be molded to fit within the auricle of the wearer's ear.

Now referring primarily to FIGS. 21 through 23, methods of using particular embodiments of the moldable earpiece heating case (1) can include obtaining a moldable earpiece heating case (1), including a container (2), a first moldable earpiece holder (3), and a second moldable earpiece holder (4), as those elements are described above, obtaining at least one of a first or second moldable earpiece (19)(38), correspondingly disposing at least one of the first or second moldable earpiece (19)(38) in the first or second moldable earpiece holding space (18)(37) of the first or second moldable earpiece holder (3)(4), and heating the moldable earpiece heating case (1).

Now referring primarily to FIG. 21, heating of the moldable earpiece heating case (1) can, but need not necessarily, be accomplished by exposing the moldable earpiece heating case (1) to heated air within an oven, or other heated environment, microwave radiation within a microwave oven, or other like method of heating an object. In particular embodiments, heating of the moldable earpiece heating case (1) can further include disposing an amount of liquid (11) in the chamber (10) defined by the container (2) prior to exposure to heat (52). In further particular embodiments, the amount of liquid (11) can be heated prior to being disposed in the chamber (10), the amount of liquid (11) and temperature of the amount of liquid (11) as previously described. In particular embodiments, such as the embodiment illustrated in FIG. 15, the amount of liquid (11) disposed in the chamber (10) can be disposed in one or more of the partition chambers (53) defined by one or more partition walls (51A, 51B, 51C, 51D, 51E), the internal surface of the container (9), and the external surfaces (16)(35) of the peripheral walls (14)(15) of the respective first or second moldable earpiece holders (3)(4).

Now referring primarily to FIG. 15, in further particular embodiments, the method of using the moldable earpiece heating case (1) can further include removably coupling a container cover (44), as described above, to the top edge (47) of the container wall (5) prior to, during, or after heating the moldable earpiece heating case (1).

Now referring primarily to FIGS. 22 and 23, in particular embodiments, the method of using the moldable earpiece heating case (1) can further include, removing the first moldable earpiece (19) in the moldable condition from the first moldable earpiece holder (3) and reconfiguring the first moldable earpiece (19) to fit within a first auricle (54) of a first ear (55). In other particular embodiments, the method of using the moldable earpiece heating case (1) can include removing the second moldable earpiece (38) in the moldable condition from the second moldable earpiece holder (4) and reconfiguring the second moldable earpiece (38) to fit within a second auricle (56) of a second ear (57).

Now referring primarily to FIG. 22, particular embodiments can provide a moldable earpiece kit (58)(encircled by broken line) including one or more of: a moldable earpiece heating case (1), and a first or second moldable earpiece (19)(38), each as above described. In particular embodiments the moldable earpiece kit (58) can provide as discrete components a moldable earpiece heating case (1) and a first or second moldable earpiece (19)(38). In other particular embodiments, the moldable earpiece kit (58) can have a first moldable earpiece (19) disposed in a first moldable earpiece holder (3) or a second moldable earpiece (38) disposed in a second moldable earpiece holder (4). In other particular embodiments, the moldable earpiece kit (58) can have a first moldable earpiece (19) disposed in a first moldable earpiece holder (3) and a second moldable earpiece (38) disposed in a second moldable earpiece holder (4).

Again referring primarily to FIG. 22, a moldable earpiece kit (58) can include one or more first moldable earpieces (19), or one or more second moldable earpieces (38), or a plurality of first (19) and second moldable earpieces (38). In particular embodiments, the moldable earpiece kit (58) can include as discrete components a moldable earpiece heating case (1) and one or more first and second moldable earpieces (19)(38). In further particular embodiments, the moldable earpiece kit (58) can include a moldable earpiece heating case (1) having at least one first moldable earpiece (19) disposed in a first moldable earpiece holder (3). In further particular embodiments, the moldable earpiece kit (58) can include a moldable earpiece heating case (1) having at least one second moldable earpiece (38) disposed in a second moldable earpiece holder (4). In further particular embodiments, the moldable earpiece kit (58) can include at least one first moldable earpieces (19) disposed in a first moldable earpiece holder (3) and at least one second moldable earpieces (38) disposed in a second moldable earpiece holder (4).

As can be easily understood from the foregoing, the basic concepts of the present invention may be embodied in a variety of ways. The invention involves numerous and varied embodiments of a moldable earpiece heating case and methods for making and using such a moldable earpiece heating case including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "container" should be understood to encompass disclosure of the act of "containing"—whether explicitly discussed or not—and, conversely, were there effectively disclosure of the act of "containing", such a disclosure should be understood to encompass disclosure of a "container" and even a "means for containing." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the moldable earpiece heating cases herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A moldable earpiece heating case, comprising:
   a container having a container wall joined to a container bottom, said container having an internal surface defining a chamber to contain an amount of liquid;
   a first moldable earpiece holder disposed within said container, said first moldable earpiece holder having a peripheral wall extending from said container bottom, said peripheral wall having an external surface configured to engage said amount of liquid within said container and an internal surface defining a first moldable earpiece holding space configured to receive a first moldable earpiece;
   a second moldable earpiece holder disposed within said container, said second moldable earpiece holder having a peripheral wall extending from said container bottom, said peripheral wall having an external surface configured to engage said amount of liquid within said container and an internal surface defining a second moldable earpiece holding space configured to receive a second moldable earpiece, said peripheral wall isolating said amount of liquid from said first moldable earpiece and said second moldable earpiece.

2. The moldable earpiece heating case of claim 1, wherein at least one of said first or second moldable earpieces correspondingly disposed in said first or second moldable earpiece holding space of said first or second moldable earpiece holder.

3. The moldable earpiece heating case of claim 2, wherein said internal surface of said peripheral wall of said first or second moldable earpiece holder conforms to a peripheral face of said first or second moldable earpiece.

4. The moldable earpiece heating case of claim 3, wherein said peripheral face of said first or second moldable earpiece generally comprises a circular peripheral face, and wherein said internal surface of said peripheral wall generally comprises a circular internal surface, said first or second moldable earpiece correspondingly disposed in said first or second moldable earpiece holder, said circular peripheral face disposed adjacent said circular internal surface of said peripheral wall of said first or second moldable earpiece holders.

5. The moldable earpiece heating case of claim 4, wherein said peripheral face of said first and second moldable earpiece have left and right mirror image symmetry, and wherein said internal surface of said peripheral wall of said first and second moldable earpiece holders each have a configuration which correspondingly conforms to said left and right mirror image symmetry of said first and second moldable earpieces.

6. The moldable earpiece heating case of claim 1, wherein said amount of liquid disposed in said container has a height lesser than said peripheral walls of said first and second moldable earpiece holders.

7. The moldable earpiece heating case of claim 6, wherein said amount of liquid comprises an amount of water.

8. The moldable earpiece heating case of claim 7, wherein said amount of water has a temperature of between about 55° C. to about 110° C.

9. The moldable earpiece heating case of claim 8, wherein said amount of water has a temperature selected from the group consisting of: about 56° C. to about 60° C., about 57.5° C. to about 62.5° C., about 60° C. to about 65° C., about 62.5° C. to about 67.5° C., about 65° C. to about 70° C., about 67.5° C. to about 72.5° C., about 70° C. to about 75° C., about 72.5° C. to about 77.5° C., about 75° C. to about 80° C., about 77.5° C. to about 82.5° C., about 80° C. to about 85° C., about 82.5° C. to about 87.5° C., about 85° C. to about 90° C., about 87.5° C. to about 92.5° C., about 90° C. to about 95° C., about 92.5° C. to about 97.5° C., about 95° C. to about 100° C., about 97.5° C. to about 102.5° C., about 100° C. to about 105° C., about 102.5° C. to about 107.5° C., and about 105° C. to about 109° C.

10. The moldable earpiece heating case of claim 1, further comprising a container cover removably coupled to said container wall.

11. The moldable earpiece heating case of claim 10, further comprising one or more aperture elements disposed in said container cover.

12. The moldable earpiece heating case of claim 11, wherein said moldable earpiece heating case comprises a material selected from the group consisting of: acrylic, nylon, acrylonitrile butadiene styrene, polylactic acid, polybenzimidzole, polycarbonate, polyether sulfone, polyethylene, urethane, silicone, wood, or metal, or combinations thereof.

13. The moldable earpiece heating case of claim 1, further comprising one or more partition walls disposed inside of said container, each of said one or more partition walls extending from said container bottom and disposed between said internal surface of said container wall and said external surface of said first moldable earpiece holder.

14. The moldable earpiece heating case of claim 13, wherein said one or more partition walls disposed inside of said container further comprise one or more partition walls extending from said container bottom and disposed between said internal surface of said container wall and said external surface of said second moldable earpiece holder.

15. The moldable earpiece heating case of claim 14, wherein said one or more partition walls disposed inside of said container further comprise one or more partition walls extending from said container bottom and between said external surfaces of said first and second moldable earpiece holders.

16. The moldable earpiece heating case of claim 15, wherein said one or more partition walls, comprise a material selected from the group consisting of: acrylic, nylon, acrylonitrile butadiene styrene, polylactic acid, polybenzimidzole, polycarbonate, polyether sulfone, polyethylene, urethane, silicone, wood, or metal, or combinations thereof.

* * * * *